(12) United States Patent
Nakajima et al.

(10) Patent No.: US 6,796,922 B2
(45) Date of Patent: Sep. 28, 2004

(54) PLANETARY GEAR DEVICE

(75) Inventors: Shinichiro Nakajima, Shiki (JP); Makoto Nishiji, Kumagaya (JP)

(73) Assignee: Bosch Automotive Systems Corp., Tokyo (JP)

( * ) Notice: Subject to any disclaimer, the term of this patent is extended or adjusted under 35 U.S.C. 154(b) by 5 days.

(21) Appl. No.: 10/380,302

(22) PCT Filed: Sep. 17, 2001

(86) PCT No.: PCT/JP01/08039

§ 371 (c)(1), (2), (4) Date: Mar. 12, 2003

(87) PCT Pub. No.: WO02/25139

PCT Pub. Date: Mar. 28, 2002

(65) Prior Publication Data

US 2004/0014555 A1 Jan. 22, 2004

(30) Foreign Application Priority Data

Sep. 19, 2000 (JP) ........................ 2000-283623

(51) Int. Cl.⁷ .............................................. F16H 37/06
(52) U.S. Cl. ...................... 475/332; 475/333; 475/344
(58) Field of Search ................. 475/332, 333, 475/334

(56) References Cited

U.S. PATENT DOCUMENTS

| | | | | |
|---|---|---|---|---|
| 3,292,456 A | | 12/1966 | Saari | ........................ 74/711 |
| 3,706,239 A | | 12/1972 | Myers | ........................ 74/715 |
| 3,792,628 A | * | 2/1974 | Stieg | ........................ 475/249 |
| 4,557,159 A | * | 12/1985 | Gross | ...................... 475/332 X |
| 4,976,669 A | * | 12/1990 | Jones | ...................... 475/332 X |
| 5,232,417 A | * | 8/1993 | Amborn et al. | ............. 475/252 |
| 6,338,691 B1 | * | 1/2002 | Morrow | .................. 475/344 X |
| 6,402,656 B1 | * | 6/2002 | Peralta | ........................ 475/252 |

FOREIGN PATENT DOCUMENTS

| | | | | |
|---|---|---|---|---|
| DE | 3834298 A1 | | 12/1972 | |
| EP | 347165 B1 | | 11/1993 | |
| JP | 4-312247 A | | 11/1992 | |
| JP | 06-117502 | * | 4/1994 | ................ 475/344 |
| JP | 9-112657 A | | 5/1997 | |

* cited by examiner

Primary Examiner—Ha Ho
(74) Attorney, Agent, or Firm—Thomas B. Ryan; Brian B. Shaw, Esq.; Harter Secrest & Emery LLP

(57) ABSTRACT

A planetary gear 5 is contacted at its at least one tooth of all its teeth $51_n$ with an end edge 23d facing an inner releasing part 23c of an inner peripheral surface of a receiving hole 23a irrespective of a rotational position of the planetary gear 5. By doing so, the planetary gear 5 is prevented from moving in the radial direction. As a result, the planetary gear 5 can be prevented from vibrating in the radial direction. Thus, vibrations of a planetary gear apparatus can be reduced, and the planetary gear and a carrier can be reduced in damage.

4 Claims, 6 Drawing Sheets

PLANETARY GEAR DEVICE

TECHNICAL FIELD

This invention relates to a planetary gear apparatus suited to be used as a differential gear mechanism of a vehicle and the like.

BACKGROUND ART

In general, a planetary gear apparatus of this type includes an inner gear, a sun gear which is disposed with an axis thereof aligned with that of the inner gear, a planetary gear disposed between and in parallel with the inner gear and the sun gear, and a carrier having a receiving hole for rotatably receiving the planetary gear. The carrier is provided with two releasing parts for releasing the receiving hole to the outside. One and the other part of an outer peripheral part of the planetary gear are exposed to the outside from the respective releasing parts. The planetary gear is engaged with the inner gear and sun gear at its respective parts which are exposed to the outside from the respective released parts (see Japanese Patent Application Laid-Open No. H04-312247 and Japanese Patent Application Laid-Open No. H09-112657).

However, the above-mentioned conventional planetary gear apparatus has such problems that the planetary gear is heavily vibrated during its rotation operation, and the planetary gear and carrier are seriously damaged. After studying very hard about those problems, it became clear for the present inventor(s) that the number of teeth of the planetary gear, which teeth contact an end edge facing an releasing part of an inner peripheral surface of the receiving hole simultaneously, is less than one. The detail of the cause will be described later.

DISCLOSURE OF THE INVENTION

In order to solve the above problems, the features of the present invention reside in a planetary gear comprising an inner gear, a sun gear disposed at an inner side of the inner gear with an axis thereof aligned with that of the inner gear, a planetary gear disposed between and in parallel relation with the inner gear and the sun gear and adapted to transmit rotation between the inner gear and the sun gear, and a carrier relatively rotatably disposed with an axis thereof aligned with that of the inner gear and having a receiving hole for receiving the planetary gear such that the planetary gear can rotation on its own axis, the carrier being provided with two releasing parts extending along the axis of the receiving hole and adapted to intercommunicate an interior part and an exterior part of the receiving hole, one of the two releasing parts being formed at an outer side and the other at an inner side in the radial direction of the carrier, an outer peripheral part of the planetary gear being exposed to the outside of the receiving hole through the two releasing parts, wherein a helical gear is used as the planetary gear, and at least one tooth of the planetary gear is capable of contacting an end edge facing the releasing parts at the inner peripheral surface of the receiving hole irrespective of a rotational position of the planetary gear.

In this case, it is preferred that the at least two teeth of the planetary gear are capable of contacting an end edge facing the releasing parts at the inner peripheral surface of the receiving hole irrespective of a rotational position of the planetary gear.

It is also preferred that at least one tooth of the planetary gear is capable of simultaneously contacting two end edges of an inner peripheral surface of the receiving hole facing two sides of the releasing parts irrespective of a rotational position of the planetary gear.

BRIEF DESCRIPTION OF THE DRAWINGS

FIG. 4(A) is a view, when the carrier is viewed in the Y-direction of FIG. 1, of a state where an optional tooth of the planetary gear begins to contact an upper end part of the end edge, and FIG. 4(B) is an end face view taken on line B—B of FIG. 4(A).

FIGS. 10(A) and 10(B) are views like FIGS. 4(A) and 4(B), respectively.

BEST MODE FOR CARRYING OUT THE INVENTION

Embodiments of the present invention will be described hereinafter with reference to FIGS. 1 through 12.

Figure 1:
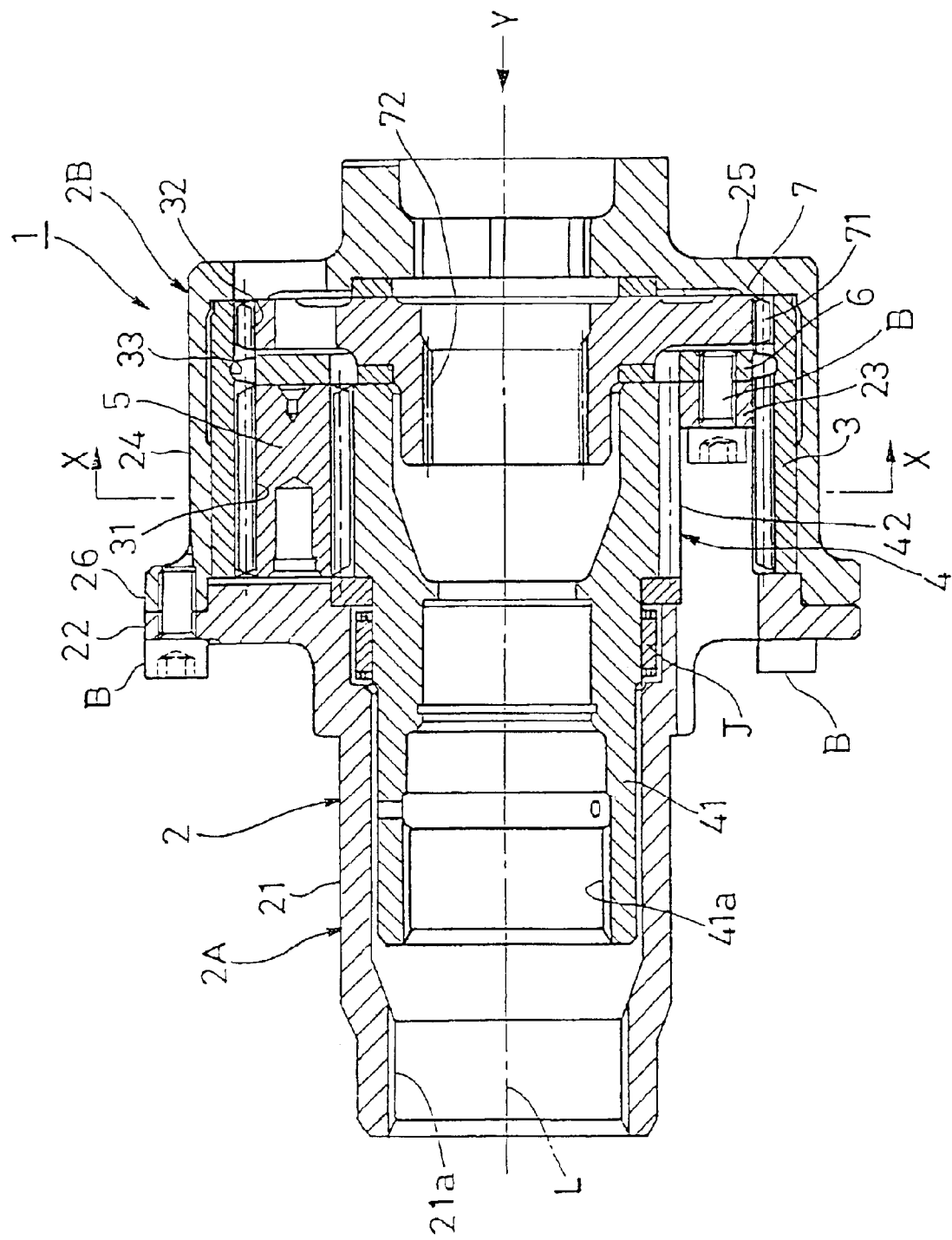
FIG. 1 is a view showing one embodiment of the present invention and is a sectional view taken on line Z—Z of FIG. 2.
Figure 2:
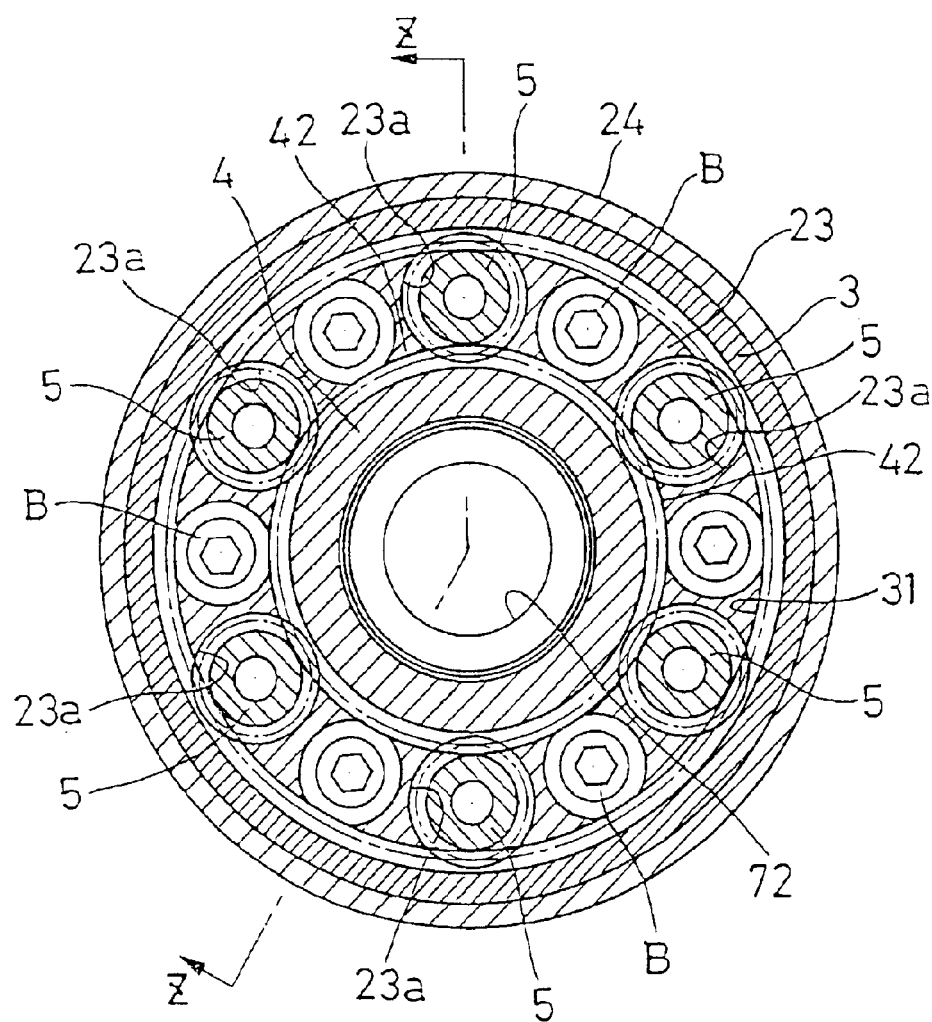
FIG. 2 is a sectional view taken on line X—X of FIG. 1.

FIGS. 1 through 6 show one embodiment of the present invention. As shown in FIGS. 1 and 2, a planetary gear apparatus 1 of this embodiment includes a housing (carrier) 2, an inner gear 3, a sun gear 4 and planetary gears 5.

The housing 2 includes two half bodies 2A and 2B. The half body (left side half body in FIG. 1) 2A includes a driving cylindrical part 21 and a flange part 22 which is formed on an end part on the half body 2B side of the driving cylindrical part 21. A spline hole 21a is formed in an end part on the opposite side to the half body 2B of the driving cylindrical part 21. A driving shaft (not shown) is non-rotatably connected to this spline hole 21a, and the entire housing 2 is driven to rotate about an axis L. A circular cylindrical retaining part 23 (see FIG. 3), which is coaxial with the axis L, is formed at an end face on the half body 2B side of the flange part 22. The other half body 2B comprises a circular cylindrical receiving cylindrical part 24 which is larger in diameter than the retaining part 23 and slightly longer than the retaining part 23, a bottom part 25 which is formed at an end part on the opposite side to the half body 2A of the receiving cylindrical part 24, and a flange part 26 which is formed at an end part on the half body 2A side of the receiving cylindrical part 24. By fixing the flange part 26 to the other flange part 22 through bolts B, the half bodies 2A, 2B are integrally fixed with their axes aligned with the axis L.

The inner gear 3 has an approximately same outside diameter as an inside diameter of the receiving cylindrical part 24 and is rotatably fitted to the receiving cylindrical part 24 with its axis aligned with the axis L. The length of the inner gear 3 is approximately same as the distance between the confronting surfaces of the flange part 22 and the bottom part 25. Accordingly, the inner gear 3 is hardly movable in its axial direction. The inside diameter of the inner gear 3 is approximately same or slightly larger than the outside diameter of the retaining part 23. A first inner gear part 31 is formed on the half body 2A side of the inner peripheral surface of the inner gear 3, a second inner gear part 32 is formed on the opposite side, and an annular recess 33 is formed between the first inner gear 31 and the second inner gear 32. The first inner gear part 31 includes a number of helical teeth. The first inner gear part 31 is dimensioned to have an approximately same length as the retaining part 23 and located at the same position as the retaining part 23 in the direction of the axis L. Accordingly, the entire first inner gear part 31 is confronted with the outer peripheral surface of the retaining part 23. The second inner gear 32, in this embodiment, is formed to have the same gear specifications and the same phase as the first inner gear part 31. Accordingly, it is accepted that the second inner gear part 32 is formed continuous with the first inner gear 31 without forming the recess 33. It is also accepted that the second inner gear part 32 is formed in such a way as to have different gear specifications from those of the first inner gear part 31. For example, the second inner gear part 32 may have straight teeth instead of helical teeth.

The sun gear 4 has a circular cylindrical configuration as a whole and is rotatably disposed within the housing 2 with its axis aligned with the axis L. The sun gear 4 comprises a circular cylindrical connecting part 41 received in the driving cylindrical part 21, and an outer gear part 42 received in the inner gear 3. The connecting part 41 is rotatably supported on an inner peripheral surface of the driving cylindrical part 21 through a bearing J. A spline hole 41a is formed in an end part on the outer side (left side in FIG. 1) of the connecting part 41. An output shaft (not shown) for transmitting the rotation of the sun gear 4 to a driven body such as, for example, one of the driving wheels of a vehicle is connected to the spline hole 41a. The outside diameter of the outer gear part 42 is approximately same or slightly smaller than the inside diameter of the retaining part 23. The outer gear part 42 is approximately same in length as the retaining part 23 and located at the same position as the retaining part 23 in the direction of the axis L. A number of helical teeth are formed on the outer peripheral surface of the outer gear part 42 over the entire length thereof.

Figure 3:
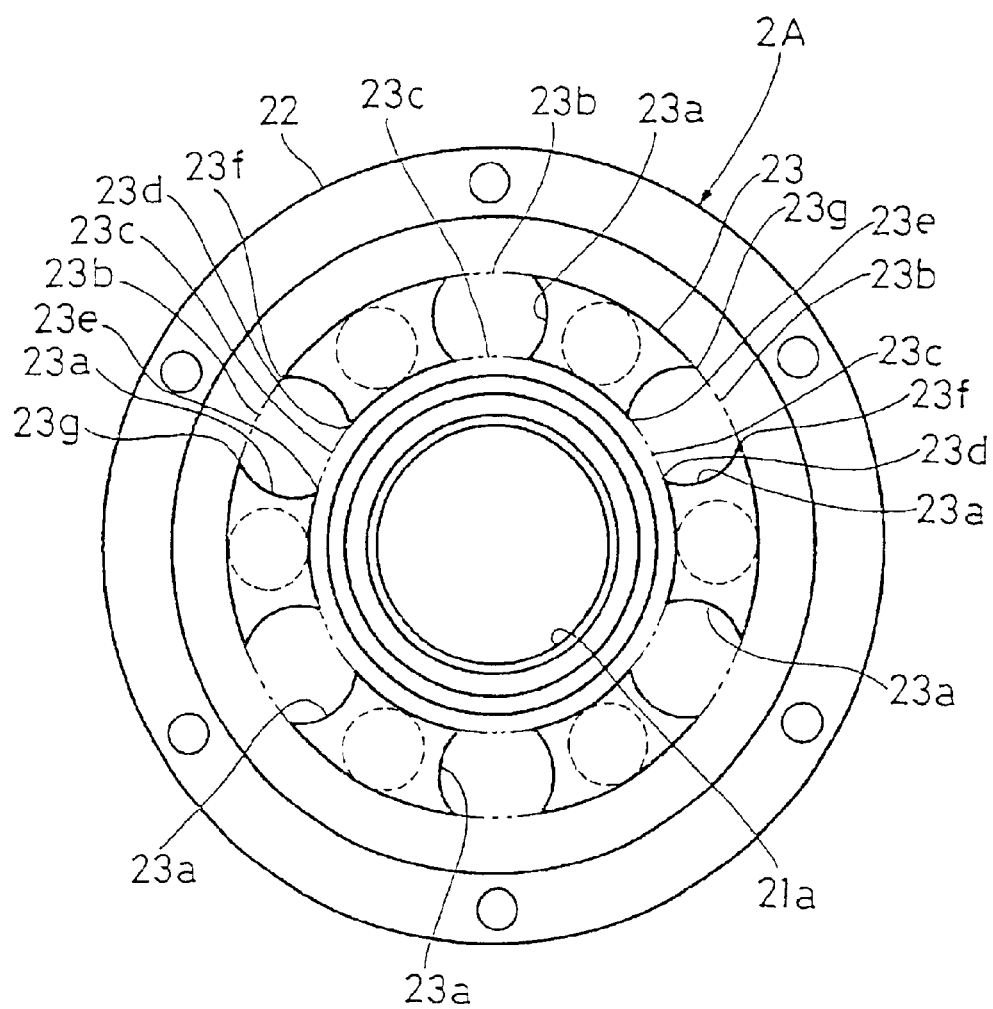
FIG. 3 is a view of one half body of a housing when viewed in a direction of an arrow Y of FIG. 1.

As shown in FIG. 3, a plurality of receiving holes 23a are formed in the retaining part 23 of the half body 2A. Each receiving hole 23a extends from a distal end face (right end face in FIG. 1) to a basal end side of the retaining part 23 in parallel with the axis L and has an approximately same length as the retaining part 23. The receiving holes 23a are equidistantly arranged in the circumferential direction of the retaining part 23. Each receiving hole 23a is disposed such that its axis is located approximately at the center between the inner peripheral surface and outer peripheral surface of the retaining part 23. Moreover, the inside diameter of each receiving hole 23a is larger than the thickness (difference between the radius of the inner peripheral surface of the retaining part 23 and the radius of the outer peripheral surface) of the retaining part 23. Accordingly, one side part on the outside of the receiving hole 23a and the other side part on the inside (one side part on the outside in the radial direction of the retaining part 23 and the other side part on the inside) are released from the outer peripheral surface and inner peripheral surface of the retaining part 23 towards the outside and inside of the housing 2, respectively. The releasing part on the outside is hereinafter referred to as the outer releasing part 23b and the releasing part on the inside is hereinafter referred to as the inner releasing part 23c.

Figure 4:
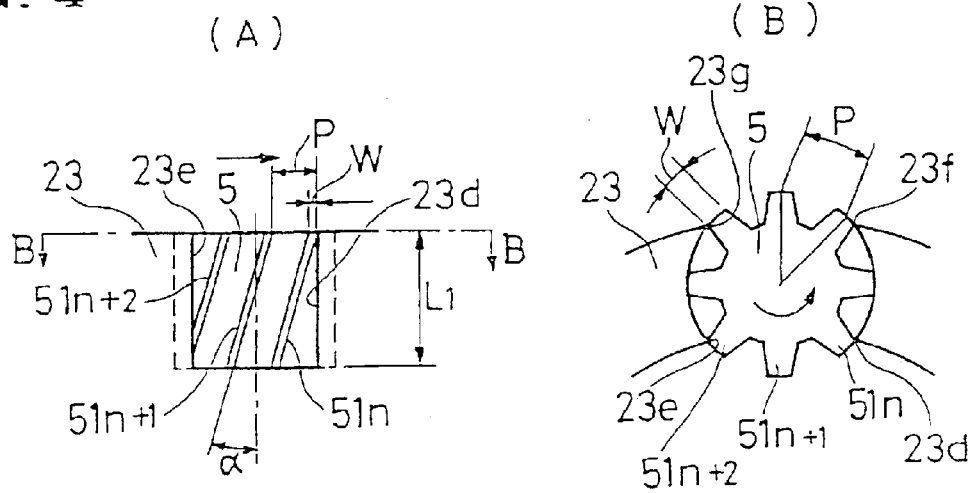
FIG. 4 are views showing relation between an end edge, which faces an inner releasing part, of an inner peripheral surface of a receiving hole of a carrier and teeth of a planetary gear received in the receiving hole.

As shown in FIGS. 1 and 2, the planetary gear 5 is rotatably received in each receiving hole 23a of the half body 2A. Accordingly, the planetary gear 5 can not only revolve about the axis L together with the housing 2 but also rotate about its own axis (axis of the receiving hole 23a). The outside diameter of the planetary gear 5 is approximately same as the inside diameter of the receiving hole 23a. Accordingly, as shown in FIGS. 2 and 4, the outer peripheral part of the planetary gear 5 is exposed to the outside from the receiving hole 23a through the inner and outer releasing parts 23b, 23c (see FIGS. 4 through 6). The planetary gear 5 is engaged at the outer releasing part 23b with the first inner gear part 31 of the inner gear 3 and engaged at the outer releasing part 23c with the outer gear part 42 of the sun gear 4. The planetary gear 5 is prevented from escaping from the receiving hole 23a by an escape-preventive plate 6 which is pressed and fixed to the distal end face of the retaining part 23 by a bolt B. Moreover, since the entire length of the planetary gear 5 is approximately same as the entire length of the receiving hole 23a, the planetary gear 5 is hardly movable in the direction of the axis L. The escape-preventive plate 6 has a generally same ring-like configuration as the sectional configuration of the retaining part 23 and is coaxial with the retaining part 23.

Between the confronting surfaces of the escape-preventive plate 6 and the bottom part 25 of the half body 2B, an output member 7 is disposed such that the axis of the output member 7 is aligned with the axis L and the output member 7 is hardly movable in the direction of the axis L. A gear part 71 is formed on the outer periphery of the output member 7. This gear part 71 is engaged with the second gear part 32 of the inner gear 3 in the same manner as the spline engagement. Accordingly, the output member 7 is rotated in unison with the inner gear 3. A spline hole 72 is formed in the inner peripheral surface of the output member 7. An output shaft (not shown) for transmitting the rotation of the inner gear 3 to a driven body such as, for example, the other driving wheel of a vehicle is connected to the spline hole 72.

Figure 5:
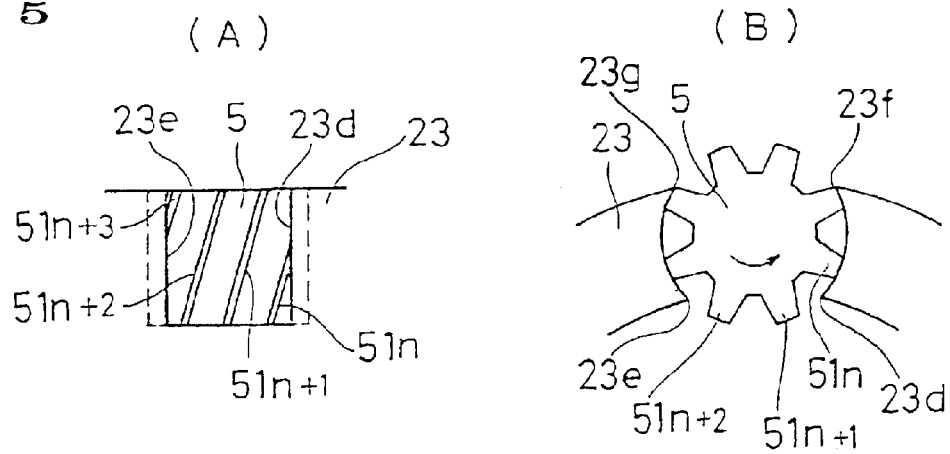
FIG. 5 are views showing states where the planetary gear has rotated by a half pitch portion at its outer peripheral surface from the states shown in FIG. 4, and FIGS. 5(A) and 5(B) are views like FIGS. 4(A) and 4(B), respectively.
Figure 6:
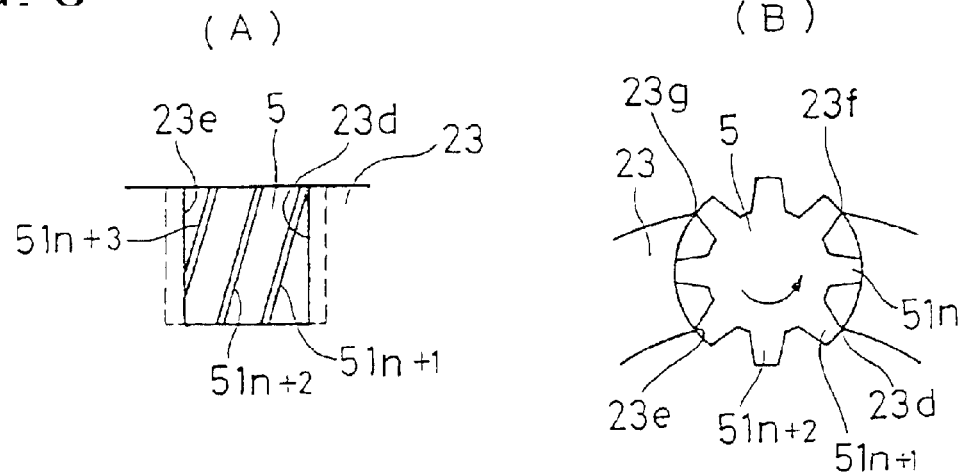
FIG. 6 are views showing states where the planetary gear has rotated by one pitch portion at its outer peripheral surface from the states shown in FIG. 4, and FIGS. 6(A) and 6(B) are views like FIGS. 4(A) and 4(B), respectively.

FIGS. 4 through 6 are views for showing a relation between each tooth of the planetary gear 5 and end edges 23d, 23e facing the inner releasing part 23c of the inner peripheral surface of the receiving hole 23a. In those Figures, an optional tooth of the planetary gear 5 is allotted with reference numeral $51_n$, and those teeth following this tooth $51_n$ backwards in the arrow direction of FIG. 5(B) are allotted with reference numerals $51_{n+1}$, $51_{n+2}$, ..., respectively. When the contacting length (which is approximately equal to the length of the planetary gear 5 in this embodiment) in the direction of the axis L (vertical direction in FIG. 5) between the outer surface of the planetary gear 5 and the inner peripheral surface of the receiving hole 23a is represented by $L_1$, the pitch (circular arc length on the outer peripheral surface, the same is applicable hereinafter) between the two teeth $51_n$, $51_{n+1}$ on the outer peripheral surface of the planetary gear 5 is represented by P, the helical angle of the teeth on the outer peripheral surface of the planetary gear 5 is represented by a and the width (circular arc length on the outer peripheral surface, the same is applicable hereinafter) of a tip land of each tooth $51_n$ in the circumferential direction of the planetary gear 5 is represented by W, the respective dimensions are established in such a way as to satisfy the following expression.

$$P \leq L_1 \cdot \text{Tan } \alpha + W$$

In case $P=L_1 \cdot \text{Tan } \alpha+W$ is established, presuming that, as shown in FIGS. 4(A) and 4(B), the planetary gear 5 is rotated in the arrow direction and its tooth $51_n$ begins to contact one end (upper end in FIG. 4(A)) in the longitudinal direction of the end edge 23d, the contacting part of the tooth $51_n$ with respect to the end edge 23d is moved to the other end side (lower end side) of the end edge 23d as the planetary gear 5 is rotated in the arrow direction (see FIGS. 5(A) and 5(B)). When the planetary gear 5 is rotated by a pitch P, as shown in FIGS. 6(A) and 6(B), the tooth $51_n$ is brought away in the rotating direction (circumferential direction of the receiving hole 23a) from the end edge 23d. Simultaneous with this, the tooth $51_{n+1}$ following the tooth $51_n$ backwards in the rotating direction begins to contact an upper edge of the end edge 23d. Thus, the planetary gear 5, when subjected to force directing to the inside of the housing 2 from the outside, is necessarily contacted at its at least one tooth $51_n$ of all its teeth with the end edge 23d irrespective of its rotational position and it never occurs that all its teeth are away from the end edge part 23d in the circumferential direction.

In case $P<L_1 \cdot \text{Tan } \alpha+W$ is established, presume $(L1 \cdot \text{Tan } \alpha+W)-P=\omega$ is satisfied. When the planetary gear 5 is rotated by a pitch P from the time the tooth $51_n$ begins to contact the end edge 23d, the tooth $51_{n+1}$ begins to contact the end edge 23d, and during the time the planetary gear 5 is rotated by the circular arc length ω, the two teeth $51_n$, $51_{n+1}$ are simultaneously contacted with the end edge 23d.

It should be noted that the above relation is likewise applicable to a relation between each tooth $51_n$ of the planetary gear 5 and the end edge 23e and a relation between each tooth $51_n$ and the end edges 23f, 23g facing the outer releasing part 23b of the inner peripheral surface of the receiving hole 23a.

In the planetary gear apparatus 1 thus constructed, presume $P>L_1 \cdot \text{Tan } \alpha+W$ is satisfied. In this case, the tooth $51_{n+1}$ following the tooth $51_n$ cannot contact the end edge 23d during the time the planetary gear 5 is rotated by the length $[(L_1 \cdot \text{Tan } \alpha+W)-P]$ in the circumferential direction from the time the optional tooth $51_n$ of the planetary gear 5 is brought away from the end edge 23d, and the number of teeth contacting the end edge 23d of the planetary gear 5 becomes less than 1. When the number of contacting teeth is less than 1, two states occur. In one state, one tooth $51_n$ of all the teeth 51 is in contact with the end edge 23d, and in the other state, all the teeth 51 is away from the end edge 23d. In those two cases, the planetary gear 5 can move by the approximately same distance as the maximum interval between a chord and an arc connecting the adjacent two teeth $51_n$, $51_{n+1}$ in the directions towards and away from the end edge 23d. However, since the difference between the outside diameter of the planetary gear 5 and the inside diameter of the receiving hole 23a is smaller than the maximum interval between the chord and the arc, the planetary gear 5 can actually move by a difference in diameter between the receiving hole 23a and the planetary gear 5. When none of the teeth 51 is in contact with the end edge 23d, the planetary gear 5 can move by the difference in diameter towards (in the direction to the inside of the housing 2) the end edge 23d compared with the case where one of the teeth $51_n$ is in contact with the end edge 23d. For this reason, when the situation is changed from a state where none of the teeth $51_n$ is in contact with the end edge 23d to a state where one of the teeth $51_n$ begins to contact the end edge 23d, the planetary gear 5 is pushed back away (in the direction to the outside of the housing 2) from the end edge 23d by the tooth $51_n$ which begins to contact the end edge 23d. Thus, when the planetary gear 5 is pushed towards the end edge 23d side by engagement between the inner gear 3 and the sun gear 4, the planetary gear 5 is moved (vibrated) towards and away from the end edge 23d in accordance with its rotation. And the entire apparatus 1 is vibrated by vibration of the planetary gears 5. Moreover, when one of the teeth $51_n$ begins to contact the end edge 23d, a part of the tooth $51_n$ hits the end edge 23d with impact. This impact causes to give damage to each tooth $51_n$ of the planetary gear 5 and the end edge 23d.

However, in the above planetary gear apparatus 1, one of the teeth $51_n$ is in contact with the end edge 23d irrespective of the rotational position of the planetary gear 5. Accordingly, the planetary gear 5 is, theoretically, not moved towards and away from the end edge 23d even when it is pushed towards to end edge 23d side by its engagement with the inner gear 3 and sun gear 4, and it maintains a prescribed position. Accordingly, the planetary gear 5 is not vibrated and the entire apparatus 1 can be prevented from vibrating. Moreover, since the planetary gear 5 maintains a prescribed position, each tooth $51_n$ of the planetary gear 5 is not collided against the end edge 23d when it begins to contact the end edge 23d, and it smoothly contacts the inner peripheral surface of the receiving hole 23a. Thus, each tooth $51_n$ of the planetary gear 5 and the end edge 23d can be prevented from getting damage. Of course, such effects as just mentioned are likewise applicable to each tooth 51n of the planetary gear 5 and other end edges 23e, 23f, 23g.

Another embodiment of the present invention will be described next. The embodiment to be described hereinafter is same in basic construction as the above-mentioned embodiment but it is different in relation between the planetary gear 5 and the receiving hole 23a, particularly between each tooth $51_n$ of the planetary gear 5 and the end edges 23d through 23g. Therefore, only the different construction will be described.

Figure 7:
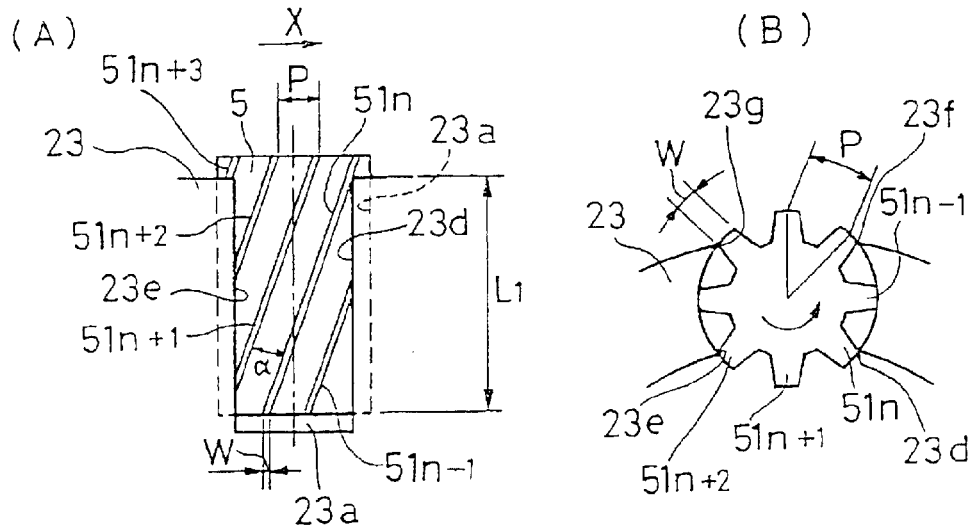
FIG. 7 are view showing a relation between teeth of a planetary gear and an end edge facing an inner releasing part of a receiving hole according to another embodiment of the present invention, and FIGS. 7(A) and (B) are views like FIGS. 4 (A) and 4(B), respectively.
Figure 8:
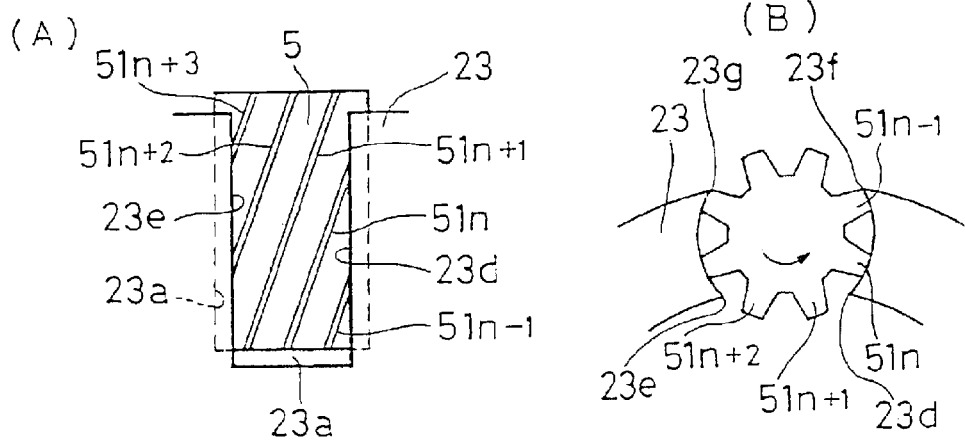
FIG. 8 are views showing states where the planetary gear has rotated by a half pitch portion at its outer peripheral surface from the states shown in FIG. 7, and FIGS. 8(A) and 8(B) are views like FIGS. 4(A) and 4(B), respectively.
Figure 9:
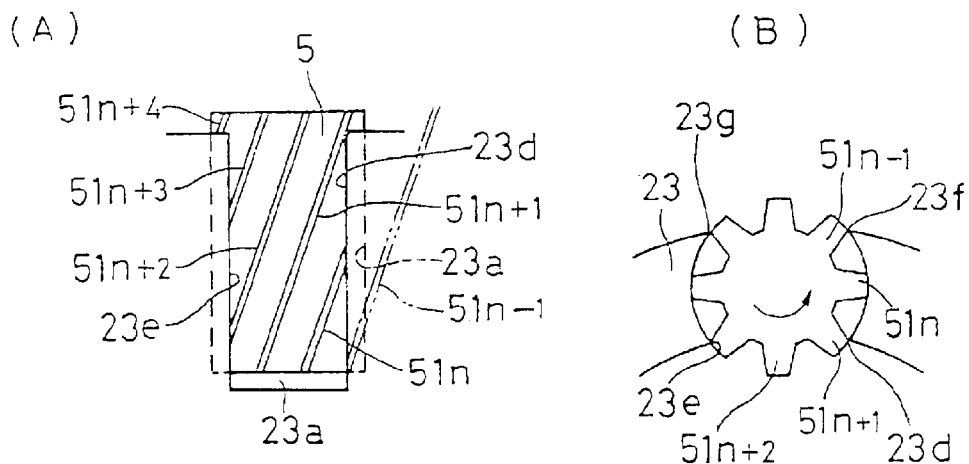
FIG. 9 are views showing states where the planetary gear has rotated by one pitch portion at its outer peripheral surface from the states shown in FIG. 7, and FIGS. 9(A) and 9(B) are views like FIGS. 4(A) and 4(B), respectively.

FIGS. 7 through 9 show a second embodiment of the present invention. In this second embodiment, one end part in the longitudinal direction of the planetary gear 5 is projected to the outside from the receiving hole 23a, and the other end face is located away from the bottom surface of the receiving hole 23a. Of course, it is accepted as in the case with the above-mentioned embodiment that the entire length of the planetary gear 5 is dimensioned to be approximately same as the entire length of the receiving hole 23a, the other end face of the planetary gear 5 is contacted with the bottom surface of the receiving hole 23a and the entire planetary gear 5 is inserted into the receiving hole 23a.

Moreover, in this second embodiment, when the contacting length between the outer surface of the planetary gear 5 and the inner peripheral surface of the receiving hole 23a is represented by $L_1$, and the pitch, the helical angle and the width of each tooth $51_n$ on the outer peripheral surface of the planetary gear 5 are represented by P, $\alpha$ and W, respectively, the respective dimensions are established in such a way as to satisfy the following expression.

$$2P = L_1 \cdot \text{Tan } \alpha + W$$

Accordingly, presuming that, as shown in FIGS. 7(A) and 7(B), the planetary gear 5 is rotated in the arrow X direction and its optional tooth $51_n$ begins to contact one end edge (upper end edge in FIG. 7(A)) of the end edge 23d, the tooth $51_{n-1}$, which is located adjacent to the front part in the rotating direction of the planetary gear 5 with respect to the tooth $51_n$, is also in contact with the end edge 23d. The contacting parts of the teeth $51_n$, $51_{n-1}$ with respect to the end edge 23d are moved to the other end side of the end edge 23d as the planetary gear 5 is rotated (see FIGS. 8(A) and 8(B)). When the planetary gear 5 is rotated by a pitch P portion, as shown in FIGS. 9(A) and 9(B), the tooth $51_{n-1}$ is brought away in the rotating direction of the planetary gear 5 from the end edge 23d. Simultaneous with this, the tooth $51_{n+1}$ begins to contact an upper end edge of the end edge 23d. As apparent from this, in this second embodiment, the two teeth $51_n$, $51_{n-1}$, which are adjacent in the rotating direction of the planetary gear 5 are simultaneously contacted with the end edge 23d. Accordingly, the planetary gear 5 can more surely be prevented from moving towards and away from the end edge 23d than in the case of the previous embodiment, thereby vibration of the planetary gear 5 can be reduced, and the tooth $51_n$ of the planetary gear 5 and the end edge 23d can get less damage.

It should be noted that the above expression $2P = L_1 \cdot \text{Tan } \alpha + W$ may be rewritten to $2P < L_1 \cdot \text{Tan } \alpha + W$ as in the abovementioned embodiment. By doing so, the number of contacting teeth with respect to the end edge 23d of the planetary gear 5 can be made larger than 2, and the number of contacting teeth becomes 2 or 3 in accordance with the rotational position of the planetary gear 5.

Figure 10:
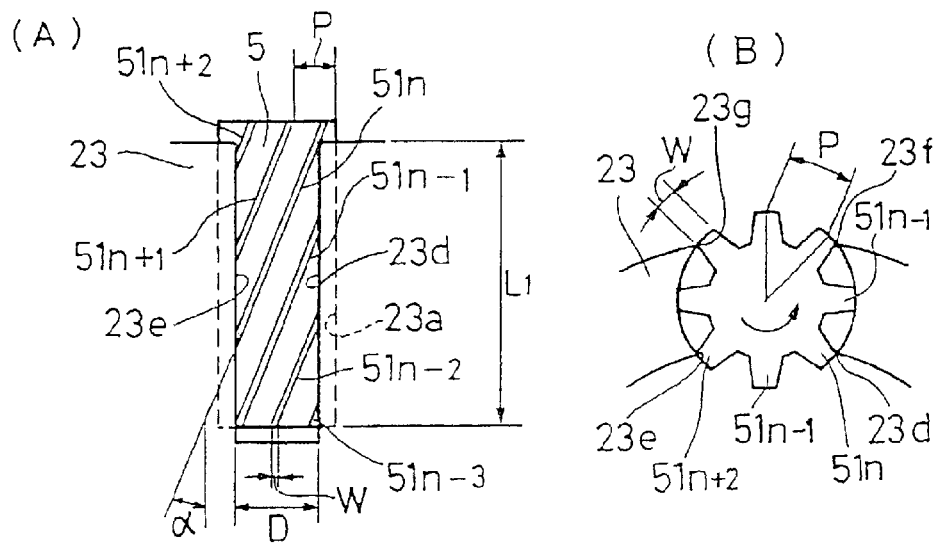
FIG. 10 are views showing a relation between teeth of a planetary gear and an end edge facing an inner releasing part of a receiving hole according to a further embodiment of the present invention.
Figure 11:
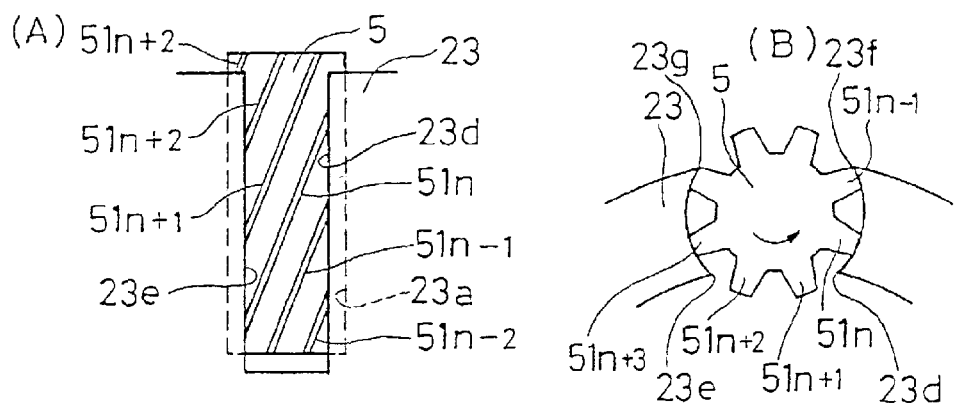
FIG. 11 are views showing states where the planetary gear has rotated by a half pitch portion at its outer peripheral surface from the states shown in FIG. 10, and FIGS. 11(A) and 11(B) are views like FIGS. 4(A) and 4(B), respectively.
Figure 12:
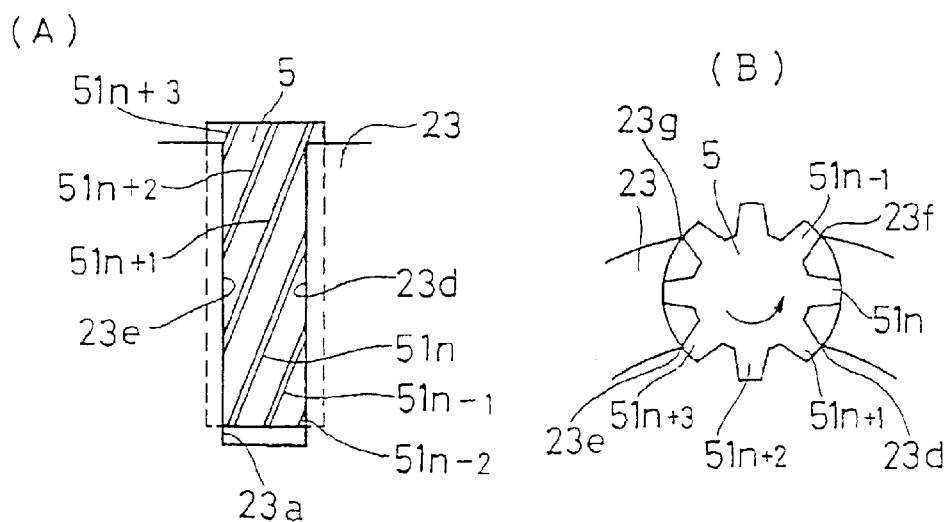
FIG. 12 are views showing states where the planetary gear has rotated by one pitch portion at its outer peripheral surface from the states shown in FIG. 10, and FIGS. 12(A) and 12(B) are views like FIGS. 4(A) and 4(B), respectively.

A further embodiment shown in FIGS. 10 through 12 is related to a planetary gear apparatus, in which at least one tooth $51_n$ can simultaneously contact both end edges 23d, 23e irrespective of the rotational position of the planetary gear 5. In order to satisfy this, when the contacting length between the outer peripheral surface of the planetary gear 5 and the inner peripheral surface of the receiving hole 23a is represented by $L_1$, the helical angle and the width of each tooth $51_n$ on the outer peripheral surface of the planetary gear 5 are represented by $\alpha$ and W, respectively, and the length (circular arc length) between the end edges 23d, 23e along the circumferential direction of the receiving hole 23a is represented by D, the respective dimensions are established in such a way as to satisfy the following expression.

$$L_1 \geq (D-W)/\text{Tan } \alpha$$

In case $L_1 = (D-W)/\text{Tan } \alpha$ is established, the planetary gear 5 is, theoretically, contacted at its one of teeth $51_n$ with the end edges 23d, 23e simultaneously irrespectively of its rotational position. In case $L_1 > (D-W)/\text{Tan } \alpha$ is established, one or plural teeth $51_n$ are contacted with the end edges 23d, 23e irrespective of the rotational position of the planetary gear 5. Such a relation as just mentioned is likewise applicable to a relation between each tooth $51_n$ of the planetary gear 5 and the end edges 23f, 23g of the outer releasing part 23b.

In the above embodiment, since at least one tooth $51_n$ is in contact with the two end edges 23d, 23e simultaneously, vibration can be reduced more effectively. In particular, this is particularly effective to a case where the direction towards which the planetary gear 5 is pushed by engagement between the inner gear 3 and the sun gear 4 varies between two directions, one towards the end edge 23d side and the other towards the end edge 23e side. Moreover, since each tooth $51_n$ is in contact with both the end edges 23d, 23e, the contact pressure between each tooth $51_n$ and the end edges 23d, 23e can be reduced to a half. Accordingly, damage occurrable to each tooth $51_n$ and the end edges 23d, 23e can also be reduced to a half. In addition, in this embodiment, the number of contacting teeth between the planetary gear 5 and the end edge 23d is 2 or more. Accordingly, vibration and damage can be reduced more effectively.

The present invention is not limited to the above embodiments. Instead, many changes and modifications can be made in accordance with necessity.

For example, in the above embodiments, although the housing 2 is driven for rotation and rotation of the inner gear 3 and sun gear 4 is used as output, it is accepted that the inner gear 3 is driven for rotation and rotation of the housing (carrier) 2 and sun gear 4 is used as output or the sun gear 5 is driven for rotation and rotation of the housing 2 and inner gear 3 is used as output.

Moreover, in the above embodiments, although only one planetary gear 5 is engaged with the inner gear 3 and sun gear 4, it is accepted, as the apparatus disclosed in Japanese Patent Application Laid-Open No. H04-312247 that a pair of mutually engaging planetary gears are disposed between the inner gear 3 and the sun gear 4, the outer planetary gear is engaged with the inner gear 3 and the inner planetary gear is engaged with the sun gear 4. In that case, a pair of receiving holes for receiving therein the one pair of planetary gears are formed in the housing 2. The respective receiving holes are communicated with each other, and the one pair of planetary gears are engaged with each other at the communicating area (releasing part). The receiving hole for receiving therein the outer planetary gear is released at one side part which is located on the outer periphery side of the housing 2, and the outer planetary gear is engaged with the inner gear 3 at the releasing part. The receiving hole for receiving therein the inner planetary gear is released at one side part which is located on the inner periphery side of the housing, and the inner planetary gear is engaged with the sun gear 4 at the releasing part. Plural pairs of such planetary gears may be equidistantly arranged in the circumferential direction.

Industrial Applicability

The differential gear apparatus according to the present invention can be used, for example, as a differential gear mechanism for differentially rotatably transmitting rotation of an engine to the left and right wheels of a vehicle or to the front and rear wheels.

What is claimed is:

1. A planetary gear comprising an inner gear, a sun gear disposed at an inner side of said inner gear with an axis thereof aligned with that of said inner gear, a planetary gear disposed between and in parallel relation with said inner gear and said sun gear and adapted to transmit rotation between said inner gear and said sun gear, and a carrier relatively rotatably disposed with an axis thereof aligned with that of said inner gear and having a receiving hole for receiving said planetary gear such that said planetary gear can rotate on its own axis, said carrier being provided with two releasing parts extending along the axis of said receiving hole and adapted to intercommunicate an interior part and an exterior part of said receiving hole, one of said two releasing parts being formed at an outer side and the other at an inner side in the radial direction of said carrier, an outer peripheral part of said planetary gear being exposed to the outside of said receiving hole through said two releasing parts, wherein a helical gear is used as said planetary gear, and at least one tooth of said planetary gear is capable of contacting an end edge facing said releasing parts at the inner peripheral surface of said receiving hole irrespective of a rotational position of said planetary gear.

2. A planetary gear apparatus according to claim 1, wherein at least two teeth of said planetary gear are capable of contacting an end edge facing said releasing parts at the inner peripheral surface of said receiving hole irrespective of a rotational position of said planetary gear.

3. A planetary gear apparatus according to claim 1, wherein at least one tooth of said planetary gear is capable of simultaneously contacting two end edges of the inner peripheral surface of said receiving hole facing two sides of one of said releasing parts irrespective of a rotational position of said planetary gear.

4. A planetary gear apparatus according to claim 2, wherein at least one tooth of said planetary gear is capable of simultaneously contacting two end edges of the inner peripheral surface of said receiving hole facing two sides of one of said releasing parts irrespective of a rotational position of said planetary gear.

* * * * *